United States Patent

[11] 3,598,483

| [72] | Inventor | Floyd M. Galbraith, Jr. |
| | | Rochester, N.Y. |
| [21] | Appl. No. | 686,467 |
| [22] | Filed | Nov. 29, 1967 |
| [45] | Patented | Aug. 10, 1971 |
| [73] | Assignee | Eastman Kodak Company |
| | | Rochester, N.Y. |

[54] BILATERAL MAGAZINE FEED MEANS FOR PROJECTOR APPARATUS
8 Claims, 4 Drawing Figs.

[52] U.S. Cl. .................................................. 353/114,
40/79, 353/113
[51] Int. Cl. ...................................................... G03b 23/14,
G03b 23/02
[50] Field of Search .......................................... 353/113,
112, 118, 111, 114; 40/36, 78, 79

[56] References Cited
UNITED STATES PATENTS

| 1,839,545 | 1/1932 | Frye | 353/113 |
| 2,505,016 | 4/1950 | Van Den Broek | 226/49 |
| 2,533,441 | 12/1950 | Estes | 353/113 |
| 2,705,437 | 4/1955 | Lessman | 353/100 X |
| 3,416,249 | 12/1968 | Millie | 40/79 |

*Primary Examiner*—Leonard Forman
*Assistant Examiner*—Steven L. Stephan
*Attorneys*—Robert W. Hampton and James J. Wood ABSTRACT: This invention relates to a bilateral magazine feed mechanism suitable for a slide projector, in which magazines are arranged at opposite ends of slide guide track. The mechanism is wholly symmetrical and reversible so that the slides may be fed in either direction as desired, either magazine serving as a supply or takeup hopper.

FLOYD M. GALBRAITH, JR.
INVENTOR.

BY James J. Wood
Robert W Hampton
ATTORNEYS

BILATERAL MAGAZINE FEED MEANS FOR PROJECTOR APPARATUS

BACKGROUND OF THE INVENTION

1. Field of the Invention

This invention relates to a bilateral means for feeding slides in both forward and reverse directions. It is especially adapted for use with a slide projector, although it may be utilized to advantage in any application where forward and reverse feeds may be utilized advantageously.

2. Description of Prior Art

It is broadly known to provide a magazine and supply hopper arrangement for slides and the like to enable feeding from both directions, that is, forward and reverse; however, most of the prior art devices are complicated, with the concomitant opportunity for mechanical failure arising from the complexity and number of components which must cooperate to produce the desired result. The present invention accomplishes bilateral feeding of slides in a simple manner to enable reliable operation.

SUMMARY OF THE INVENTION

The instant invention relates to a bilateral magazine feed means suitable for a slide projector, and adapted to feed slides in both forward and reverse directions for subsequent projection on a viewing screen. Interchangeable and symmetrical supply and exit feed means are disposed at each end of a guide track and on opposite sides thereof. A slide-feeding means is reciprocally displaceable relative to the track for feeding slides in either direction.

Accordingly, it is an object of this invention to provide a bilateral magazine feed means in which the operation is simple, so as to reduce the chances for mechanical failure.

The novel features which are believed to be characteristic of the invention are set forth with particularity in the appended claims.

The invention itself, however, both as to its organization and method of operation, together with further objects and advantages thereof, may best be understood by reference to the description to follow, considered in connection with the accompanying drawings.

DESCRIPTION OF THE PREFERRED EMBODIMENT

Figure 1:
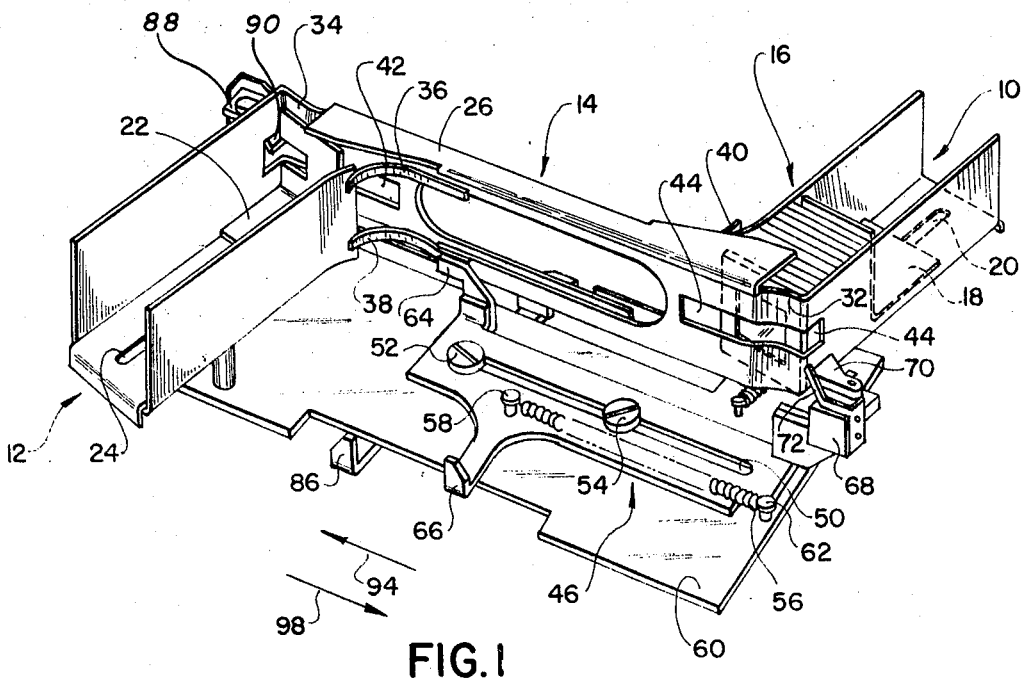
FIG. 1 is a pictorial view of the bilateral magazine feed means, in accordance with the instant invention, showing the slides in a magazine, with slide displacement impending in a direction from right to left.

Referring now to FIGS. 1 to 4, magazines indicated generally at 10, 12 are disposed at each end of a guide track indicated at 14. As will be apparent as the description proceeds, the magazines may variously serve as supply and exit or takeup magazines, depending upon the direction of travel of the slides. Stated differently, magazine 10 may be at one time the supply magazine. A supply of slides indicated generally at 16 are stacked in magazine 10, and are urged forward by means of a right-angle plate member 18, which is biased by a spring (unnumbered) so as to move under the discipline of the groove 20. A similar mechanism is provided in magazine 12, there being shown a right-angle plate at 22, spring biased to move in the groove 24. Upon leaving the magazine 10, the slides are constrained to rectilinear translation by the guide means 14. A guide cover 26 is provided for the guide track means 14.

Figure 4:
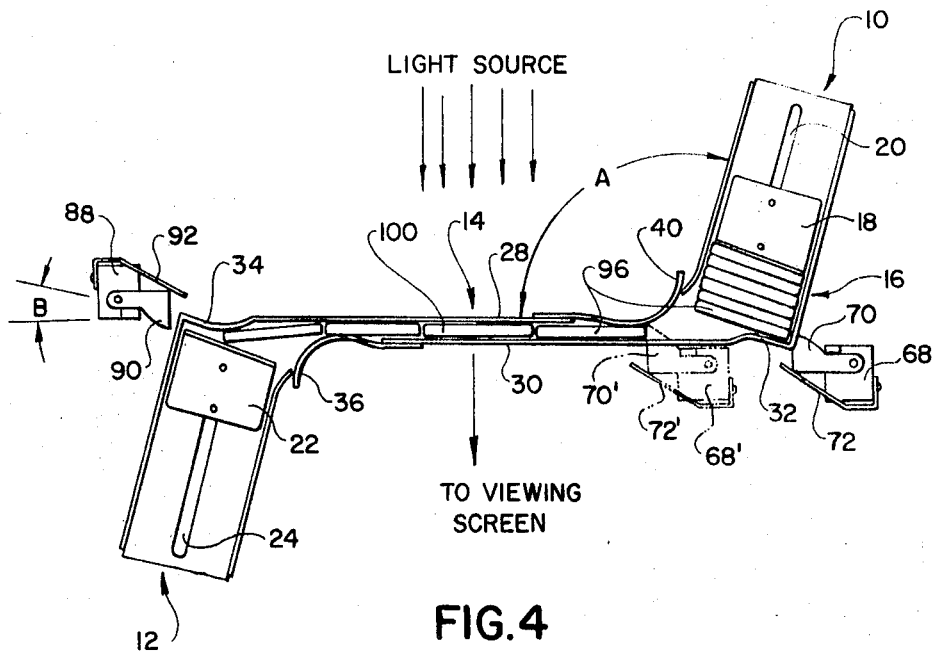
FIG. 4 is a top plan view with the guide track cover removed and showing the slides in the guide track moving from the supply magazine to the exit magazine, and indicating the action of the spring-leaf-actuated dog members.

As best shown in FIG. 4, where the guide cover 26 for the guide track has been removed, the guide 14 comprises essentially parallel track members 28, 30 which are substantially parallel for the greater portion of their length. The parallel plate, or track 30 has an arcuate cam surface at 32, which as best shown in FIG. 4, tilts the slides 16 as they begin movement into the guide 14. Similarly, the plate 28 is formed to provide an arcuate cam surface 34, which assists the turning movement of a slide as it makes its entrance into the magazine 12.

The guide means 14 includes leaf spring members 36, 38 (FIGS. 1, 2, 4) in proximity to the magazine 12, and complementary leaf spring members for magazine 10, only one of which, 40 (FIGS. 1, 2, 4) can be seen in the drawing. The leaf spring members 36, 38 play an active role in feeding the slides from left to right as viewed in FIGS. 1 and 2, whereas in feeding the slides from right to left, as viewed in FIGS. 1 and 2, their role is a passive one, as they merely guide or constrain a discrete slide in its movement. Similarly, the spring leaf members for the magazine 10 play exactly the same role, only in reverse, as regards movement of the slides from left to right and right to left.

Figure 2:
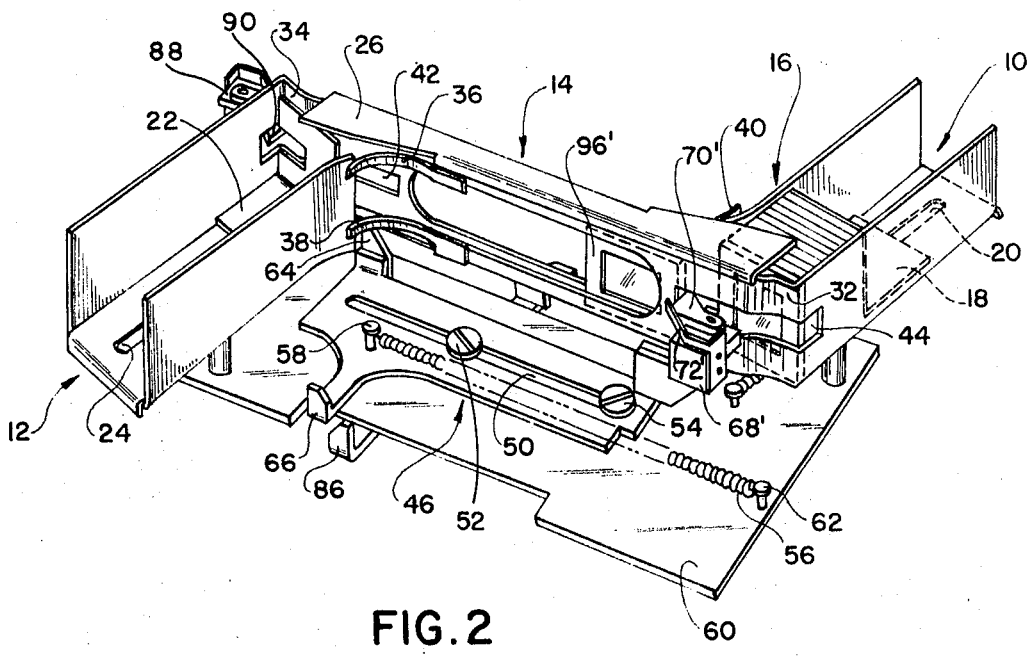
FIG. 2 is a similar pictorial view of the bilateral magazine feed means in accordance with the instant invention, showing a slide partially moved toward the left-hand magazine.
Figure 3:
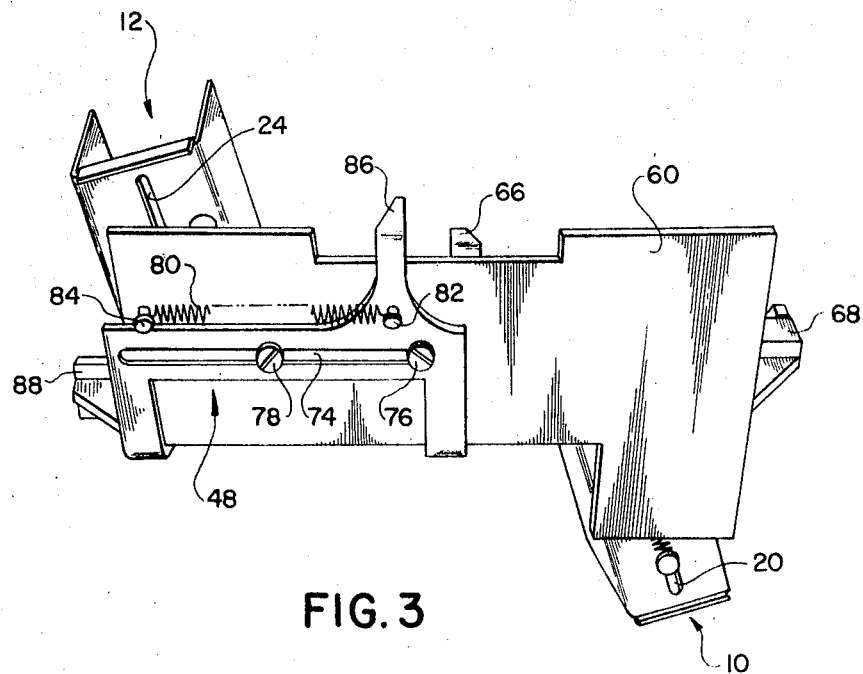
FIG. 3 is a bottom pictorial view showing the underside of the bilateral magazine feed means in accordance with the invention.

Referring now to FIGS. 1, 2, and 3, the guide cover 26 is slotted at 42, 44 as shown. Mechanism displacement members indicated generally at 46, 48 are for moving the slides from right to left or left to right. As may be seen from a study of FIGS. 1 and 3 in particular, these displacement members 46, 48 are entirely symmetrical in construction. The displacement member 46 contains a groove 50 with stop screws 52, 54 arranged therein, and under the discipline of the stop screws 52, 54, the displacement member 46 may be moved in rectilinear displacement from right to left, the farthest position to the right as viewed in FIG. 1, being determined by the position of the screw 52, and the farthest advance to the left being determined by the stop screw 54 as best shown in FIG. 2. The displacement member 46 is spring biased toward the right, as viewed in FIG. 1 by means of a spring 56, secured to the displacement member 46 by any convenient manner, such as a post 58, the other end of the spring 56 being secured to a baseplate 60 by means of a screw or post 62. The displacement member 46 includes a guide member 64, having a fingerlike extension which cooperates with the magazine 12 in a manner which will subsequently be made clear. The displacement member 46 is moved by means of projection 66, which receives its motivating force from any convenient source which in the interests of clarity is not shown on the drawing. At the other end of the displacement member 46, a suitable support member 68 is adapted to support a dog 70, which is biased by means of spring leaf member 72, in a direction which disciplines it to enter the groove 44 in the guide cover member 26.

The displacement member 48, for movement in the opposite direction, is in all respects symmetrical with the displacement member 46. It includes a groove 74 with stop screws 76, 78 arranged therein. The displacement member 48 is biased to the left, as viewed in FIG. 3, by means of a spring 80, secured to the displacement member by a post at 82, and secured to the baseplate 60 by means of post 84. The displacement member 48 includes a fingerlike member (not visible in FIG. 3) similar to finger member 64, shown in FIGS. 1 and 2, and also projection member 86. As best shown in FIG. 4, the displacement member 48 also carries a support means 88 (FIG. 4) which supports a finger or dog 90 biased by a spring leaf member 92.

OPERATION

Referring again to FIGS. 1, 2, and 4, assume that slides 16 are arranged in the magazine 10 and it is desired to project a slide onto a viewing screen. Assume further the displacement member 46 is displaced in the direction shown by the arrow 94, by any convenient prime mover means. By way of example, slide 96 (FIG. 4) begins to leave the discipline provided by the guide walls of the magazine 10 as the leading edge of slide 96 begins to fall forward in the direction of the guide 14. As slide 96 hits the cam surface 32, its forward motion is temporarily arrested and its leading edge (in the direction of intended travel) is further displaced in the direction of the guide track 14. The dog 70, carried by displacement member 46, reaching in the groove 44, mechanically pushes the slide 96 to the left, as it is itself carried by the displacement member 46. As shown in phantom section in FIG. 4, slide 96 is carried forward by the action of the dog now identified at 70' to the position indicated. This displacement of the slide 96' is also shown in FIG. 2 where the active parts are again assigned primed identification.

In the invention illustrated in FIG. 4, the slide identified at 100 is in the projection station. As will be observed in FIG. 4, the slides in the guide 14 are edge to edge, the movement of one serving to displace an adjacent slide through the guide 14 in the selected direction of travel. The displacement member 46 moved to the left, and the slides are carried to the left until the dog 70 reaches the end of its travel as defined by the slot 44; the length of the slot 44 effectively defines the length of travel of one slide, at which time the displacement force upon the projection member 66 is removed, and the member 46 returns to the right or rest position as shown in FIG. 1, under the action of the spring 56. Under the urging of the spring leaf member 72, the dog 70 again enters the slot 44 to rest against the next slide, in the manner shown in FIG. 4. The slides are thus indexed in a desired or times sequence through the guide 14 to the projection station.

After its projection on a viewing screen, the slide 96' approaches the end of the guide track member 14 and moves into the magazine 12 under the combined discipline of finger 64 and cam surface 34: the finger 64 helps to tilt the slide, and under the guidance provided by cam surface 34, the slide 96 moves into position so as to align itself in contiguous relationship with the right-angle plate member 22. The displacement member 46 continues to be successively displaced until the slides in the magazine 10 have all been shown.

It will be appreciated that for clarity in the description, attention has been focused on one or two slides. It will of course be understood at this point that after the initial few slides have been displaced, the action is dynamically myriad at the same time as a slide is being displaced by a displacement member (46 or 48) a slide is moving in the projection station, the slides are nudging each other through the guide track 14, and a slide is dropping into the exit hopper or magazine (10 or 12).

If, for any reason, the operator should wish to redisplay a slide, or go back three or four slides that have previously been shown, this can easily be done by displacing projection 86 in the direction shown by the arrow identified as 98 (FIG. 1) until the slide of interest is in the projection station.

The bilateral mechanism is therefore completely symmetrical and reversible, so that slides may be fed and recovered in either direction.

In order to insure successful operation, it is necessary that the magazines 10, 12 be oriented in the correct angular relationship as regards the guide track 14: This orientation is identified as an interior angle A in FIG. 4. Similarly, in order to insure that the slides will be tilted properly in the magazine, the cam surfaces, such as 34 (FIG. 4) must possess the correct angular relationship as regards the parallel path afforded by the guide track 14: This is defined in FIG. 4 as the angular measurement B. In one practical embodiment, it has been found that the magazines 10 and 12 were effectively utilized with an angular measurement A of 98°, and the cam surfaces 32, 34 and guide track 14 have an angular measurement B empirically determined to be 8°. Stated differently, the straight line portions of the cam surfaces 32, 34 are respectively at right angles to the axis of the magazines 10, 12. (This is the angular difference A-B in FIG. 4, or 98°-8°=90°.)

The invention has been described in detail with particular reference to preferred embodiments thereof, but it will be understood that variations and modifications can be effected within the spirit and scope of the invention as described hereinabove and as defined in the appended claims.

I claim:

1. In a slide projector having a light source for emitting light in a first path, a mechanism for transporting slides across said first path, said mechanism comprising:
   a track for guiding slides in sequence in a second path which is linear and perpendicular to said first path, said track having first and second ends;
   a first magazine extending from one end of said track in one direction transverse to said track, said one direction and said second path defining an obtuse interior angle;
   a second magazine extending from the other end of said track in a second direction opposite said one direction and parallel to said first magazine; each of said magazines having two sides, one of which forms one of the sides of said obtuse interior angle, the other of said sides being positioned opposite said one side;
   said magazines each being configured to hold a stack of slides each slide being maintained perpendicular to the magazine and each magazine including biasing means for urging the stack of slides towards said track so that a slide in each magazine is disposed nearest the track, said magazines alternatively dispensing slides to said track or receiving slides from said track;
   first cam means associated with each magazine and connecting the track to the magazine at said one side, and first movable means for engaging the slide in the magazine nearest the track and urging the slide along said first cam means, said first cam means being contoured to change the orientation of a slide from perpendicular to the magazine to parallel to the track, and to position a slide on the track as it is urged along said first cam means;
   second cam means associated with each magazine and connecting the track to the magazine at said other side, and second movable means for engaging the slide in the track nearest the magazine and urging the slide along the second cam means and into the magazine; said second cam means being contoured to act in conjunction with the biasing means to change the orientation of the slide from parallel to the track to perpendicular to the magazine as said second movable means urges the slide along said second cam means;
   first displacement means for effecting the transport of slides from the first magazine to the second magazine, said first displacement means having coupled thereto the first movable means associated with the first magazine and the second movable means associated with the second magazine, and said displacement means being actuable for moving the first movable means coupled thereto to successively move slides from the first magazine into said track to thereby displace other slides in said track towards the second magazine and for moving the second movable means coupled thereto to move slides at the end of said track adjacent the second magazine into the second magazine;
   second displacement means for effecting the transport of slides from the second magazine to the first magazine, said second displacement means having coupled thereto the first movable means associated with the second magazine and the second movable means associated with the first magazine, and said second displacement means being actuable for moving the first movable means coupled thereto to successively move slides from the second magazine into said track to thereby displace other slides in said track towards the first magazine and for moving the second movable means coupled thereto to move slides at the end of the track adjacent the first magazine into the first magazine; and
   means for selectively actuating said first displacement means or said second displacement means.

2. A mechanism according to claim 1 wherein said track comprises a pair of substantially parallel, opposed plate members for supporting slides in a contiguous relationship.

3. A mechanism according to claim 1 wherein the first cam means comprises an arcuate surface having one end spaced from said track and being contoured substantially parallel to the direction in which the magazine extends and a second end aligned with said track.

4. A mechanism according to claim 3 wherein said first cam means further comprises leaf spring means for cooperating with said arcuate surface to orient a slide for movement onto said track.

5. A mechanism according to claim 1 wherein the second cam means includes a flat surface defined by a plane normal to the direction in which the magazine extends.

6. A mechanism according to claim 5 wherein said second movable means associated with each magazine comprises a fingerlike guide member for engaging a slide on said track adjacent the magazine and moving the slide onto the flat cam surface associated with the magazine, in response to actuation of the displacement means to which said second movable means is coupled.

7. A mechanism according to claim 1 wherein the first movable means associated with each magazine is a dog member movable from a rest position in a path across the magazine for engaging the slide in the magazine nearest the track and moving the slide along the track in response to actuation of the displacement means to which said first movable means is coupled, said dog member being biased towards the rest position.

8. A mechanism according to claim 1 wherein said first and second displacement means are actuable for movement from inactive rest positions, and said displacement means are biased towards said rest positions.